United States Patent [19]

Focke et al.

[11] Patent Number: 5,121,585
[45] Date of Patent: Jun. 16, 1992

[54] APPARATUS FOR ATTACHING LABELS OR THE LIKE TO PACKS

[75] Inventors: Heinz Focke; Wolfgang Oertel, both of Verden; Fred Philipowsky, Berlin, all of Fed. Rep. of Germany

[73] Assignee: Focke & Co. (GmbH & Co.), Verden, Fed. Rep. of Germany

[21] Appl. No.: 639,446

[22] Filed: Jan. 10, 1991

[30] Foreign Application Priority Data

Jan. 12, 1990 [DE] Fed. Rep. of Germany ....... 4000685

[51] Int. Cl.⁵ .............................................. B65B 51/06
[52] U.S. Cl. ................................. 53/136.1; 53/387.2; 53/389.1; 53/136.4
[58] Field of Search ............... 53/136.1, 136.4, 387.2, 53/234, 575, 389.1, 233; 156/483, 484, 485

[56] References Cited

U.S. PATENT DOCUMENTS

| | | | |
|---|---|---|---|
| 3,236,026 | 2/1966 | Evans | 53/387.2 |
| 3,608,270 | 9/1971 | Rudszinat | 53/234 |
| 4,198,258 | 4/1980 | Glosmann | 156/484 |
| 4,484,432 | 11/1984 | Oberdorf | 53/575 |
| 4,620,891 | 11/1986 | Applegate | 53/136.1 X |

FOREIGN PATENT DOCUMENTS 2359032  2/1978  France .
2409914  6/1979  France .
2189429  10/1987  United Kingdom .

Primary Examiner—John Sipos
Attorney, Agent, or Firm—Sughrue, Mion, Zinn, Macpeak & Seas

[57] ABSTRACT

Cigarette packs (20) are often provided with a (tax) label (26) which extends across an end face (23) and adjoining pack faces. The process of attaching the label (26) has to be integrated into the complex flow of production. For this purpose, the label (26) is held ready in front of a mouthpiece opening (inserting opening 32) in a transverse plane, such that the label is folded round the pack (20) in a U-shaped manner when the pack passes through the mouthpiece opening. The packs (20) are transported in tight arrangement, such that the end face (23) of one pack (20) abuts the bottom (35) face of another pack (20) being in front. The label (26) is thus "clamped" between two adjacent packs (20) and therewith additonally fixed in position. The labels (26) are introduced into the continuous feed flow of the packs (20) and of the pack channels (31) for receiving the packs via a stationary label dispenser (84), such that the labels (26) are held ready in front of the inserting opening (32) of a pack channel (31) and are folded in a U-shaped manner by the insertion of the pack (20) into the pack channel.

14 Claims, 12 Drawing Sheets

— 5,121,585 —

APPARATUS FOR ATTACHING LABELS OR THE LIKE TO PACKS

BACKGROUND OF THE INVENTION

The invention relates to an apparatus for attaching strip-like blanks, especially (revenue) labels, to an end face of a cuboidal (cigarette) pack, said strip-like blank being held ready in front of a mouthpiece in a plane transverse to the conveying direction of the pack pointing with its end face in the transport direction and said strip-like blank being folded round said end face and adjoining pack faces (front wall, rear wall) when the pack is pushed through the mouthpiece.

Cigarette packs are in many countries provided with a revenue stamp or label which extends transversely across an end face of a pack, such that legs of the label folded in a U-shaped manner abut the pack in the region of front wall and rear wall and are adhesively bonded thereto. The process of attaching the label to the pack has to be integrated into the production sequence of the packaging machine. In packaging machines of high performance, this can lead to problems.

SUMMARY OF THE INVENTION

The invention is based on the object to propose a packaging machine or a unit thereof, which ensures an efficient and reliable attachment of labels or similar adhesive strips to the pack, without impairing the capacity or interrupting the packaging process.

To attain this object, the apparatus as taught by the invention is characterized in that packs can be successively conveyed in a tightly arranged row through the mouthpiece, such that while the end face of the pack is taking over the label and thereafter, the label held ready in the region of the mouthpiece abuts a bottom face, located opposite said end face, of a pack lying in front of the other pack in the conveying direction, such that said label is fixed in position between end face and bottom face of two adjacent packs.

Thus, the invention on the one hand provides that the label is folded into the proper pack position by the mouthpiece and on the other hand avoids undesirable displacements of the label before the glue areas are sufficiently set by additionally fixing said label in position between abutting faces of adjacent packs, namely between end face and bottom face of successive packs.

The mouthpiece opening or inserting opening may be arranged in the normal transporting path of the packs, so that during this predetermined transport, the label is placed against the pack in its proper position with the insertion of the pack through this inserting opening.

According to a further feature of the invention, the packs are, in order to attach the label, pushed into an elongated channel-like shaft (pack channel) having a cross-section corresponding to the cross-section of the pack and having a length several times the length of the pack. The mouthpiece forms the entrance of the pack channel, with the label being held ready in front of the mouthpiece in up-right and stretched-out transverse position, such that with the inserting movement, the label is folded around the end face in a U-shaped manner.

According to the invention, the elongated pack channel has a further function of shaping and stabilizing the shape of the packs. These packs have folding tabs connected by adhesive bonding which at this point has not sufficiently set. The (additional) task of the pack channels is to stabilize the positioning of the adhesively bonded label and of the adhesively bonded folding tabs after insertion of the pack.

The invention provides that the label is transferred to the pack while the latter is continuously transported. The pack channels are transported transverse to their longitudinal direction. The labels are transported with the same speed in a position in front of the inserting openings, and the packs are also transported with the same speed while being pushed forward in the longitudinal direction of the pack channels at the same time. Thus, an altogether continuous transport takes place simultaneously with a progressive transfer of the labels to the packs.

In front of the entrances of the continuously transported pack channels, there is a label dispenser arranged in fixed location and designed in a special way. This dispenser positions the labels in the exact relative position for the take-over by the associated pack.

Further features of the invention relate to the design of the pack channels and the label dispenser.

Exemplary embodiments of the apparatus as taught by the invention will be described in the following with reference to the drawings, in which:

DESCRIPTION OF PREFERRED EMBODIMENTS OF THE INVENTION

Figure 1:
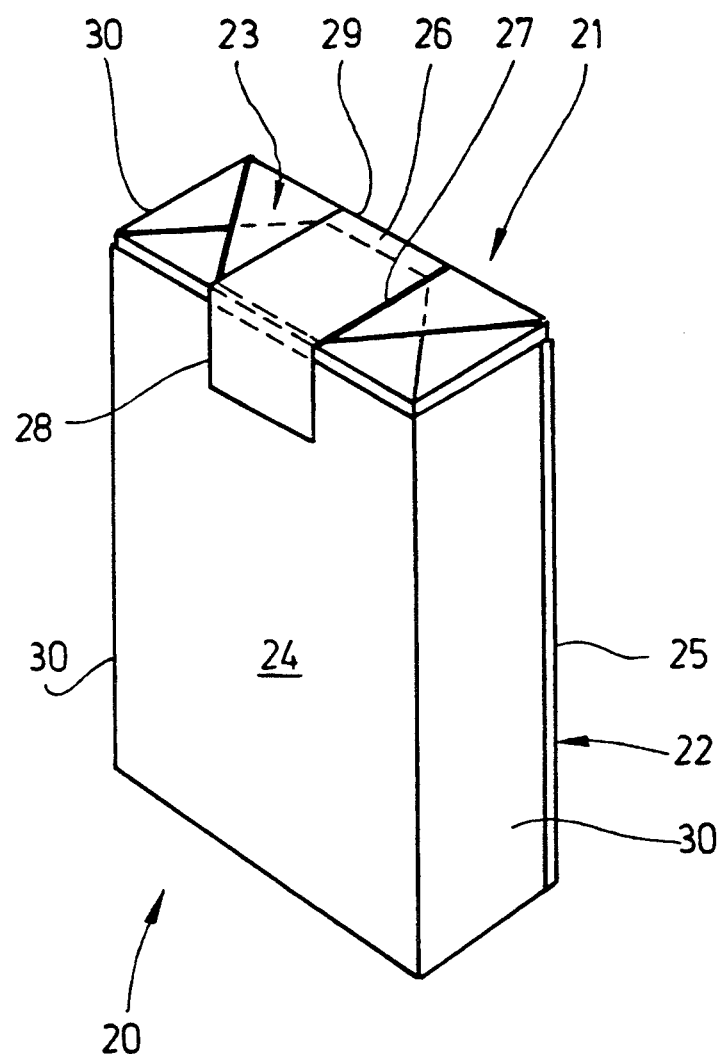
FIG. 1 is a perspective view of a pack, namely a soft cup pack for cigarettes.

The exemplary embodiments of the apparatus which are shown in the drawings are particularly suitable for the treatment of cuboidal packs 20 (FIG. 1) of the soft cup type for accommodating cigarettes. Packs 20 of this type consist of an inner wrapping—usually of tin foil—for a cigarette group. The inner wrapping surrounds the cigarette group on all sides and thus forms a cigarette block 21. An outer wrapping is usually made of paper and is formed as a cup 22, i.e. it is open at the top. The cigarette block 21 slightly projects from the cup 22 at the top side.

The pack designed in this way comprises, amongst others, an (upper) end face 23 and adjoining rectangular faces located opposite to one another, namely front side 24 and rear side 25, so that the pack has an overall cuboidal shape. An adhesively affixed strip of material or blank extends across the end face 23, namely a (revenue) label 26. This label 26 rests with a central portion 27 on the end face 23. Legs 28, 29 extend in the region of front side 24 and rear side 25.

After production, the packs 20 are inserted into holders or pockets which correspond to the (cross-sectional) shape of the packs 20 and thus surround the latter in a form-fitting positive manner. In the present embodiment, the apparatus is equipped with elongated shell-like holders for the packs 20, namely with pack channels 31, (FIG. 2) each for receiving a plurality of packs 20—in the shown embodiment (FIG. 4) in each case three packs 20. The pack channels 31 are open at both ends, so that the packs 20 can be inserted at the one end, namely via an inserting opening 32, into the pack channel 31 in the longitudinal direction thereof. At the opposite end, the inserting process causes a pack 20 to leave the pack channel 31 via a discharge opening 33 at the same time. The side faces 30 of the pack 20 abut side walls 34 of the pack channel 31. The end faces 23 bear against bottom faces 35 of adjacent packs 20 within the pack channel 31.

Figure 11:
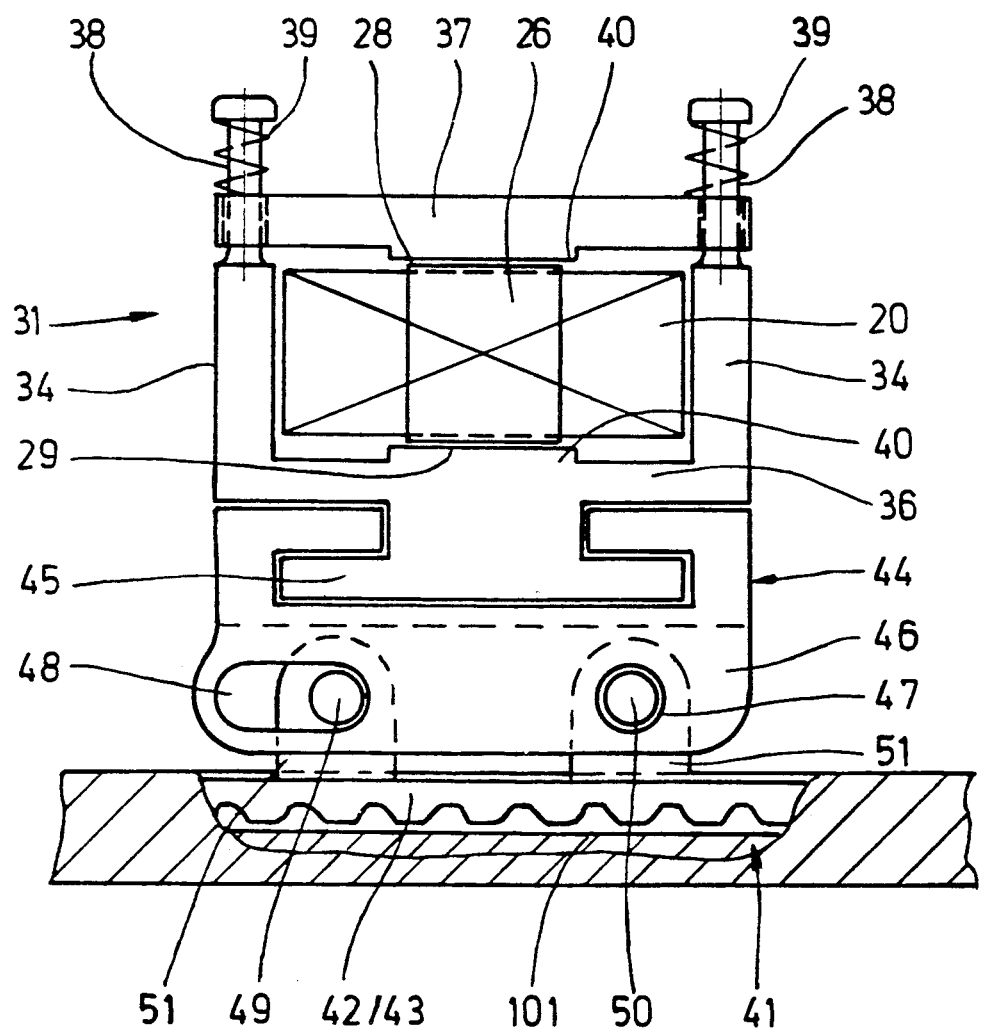
FIG. 11 shows a cross-section taken along the line XI—XI of FIG. 7—embodiment according to FIG. 4.
Figure 13:
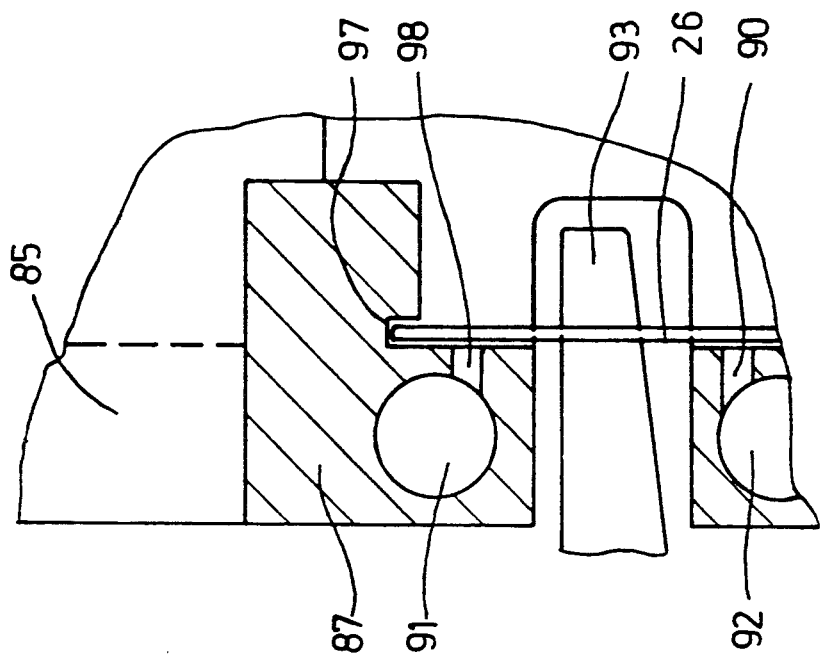
FIG. 13 shows a detail of FIG. 12 on an even further enlarged scale.

An advantageous embodiment of a cross-sectional design of the pack channel 31 follows in particular from FIG. 11. Accordingly, a bottom wall 36 forms a unit with the side walls 34, namely a profile having a U-shaped cross-section. A top wall 37 is formed as a separate element and is movably connected to the side walls 34. The latter is for this purpose provided with (upright) supporting bolts 38, on which the top wall 37 is shiftably mounted with respective bores. The top wall 37 is pressed against the upwardly facing side of the pack 20 with elastic pressure, in the present case by means of pressure springs 39 arranged on the supporting bolts 38. As a result, a form-shaping pressure is applied to the packs 20 in the pack channel 31.

Bottom wall 36 and top wall 37 do not abut the packs 20 with their full surface, but with ridge-like elevations 40. These extend in the central region of the pack channel 31, with a width being greater than that of the (likewise central) label 26.

Figure 2:
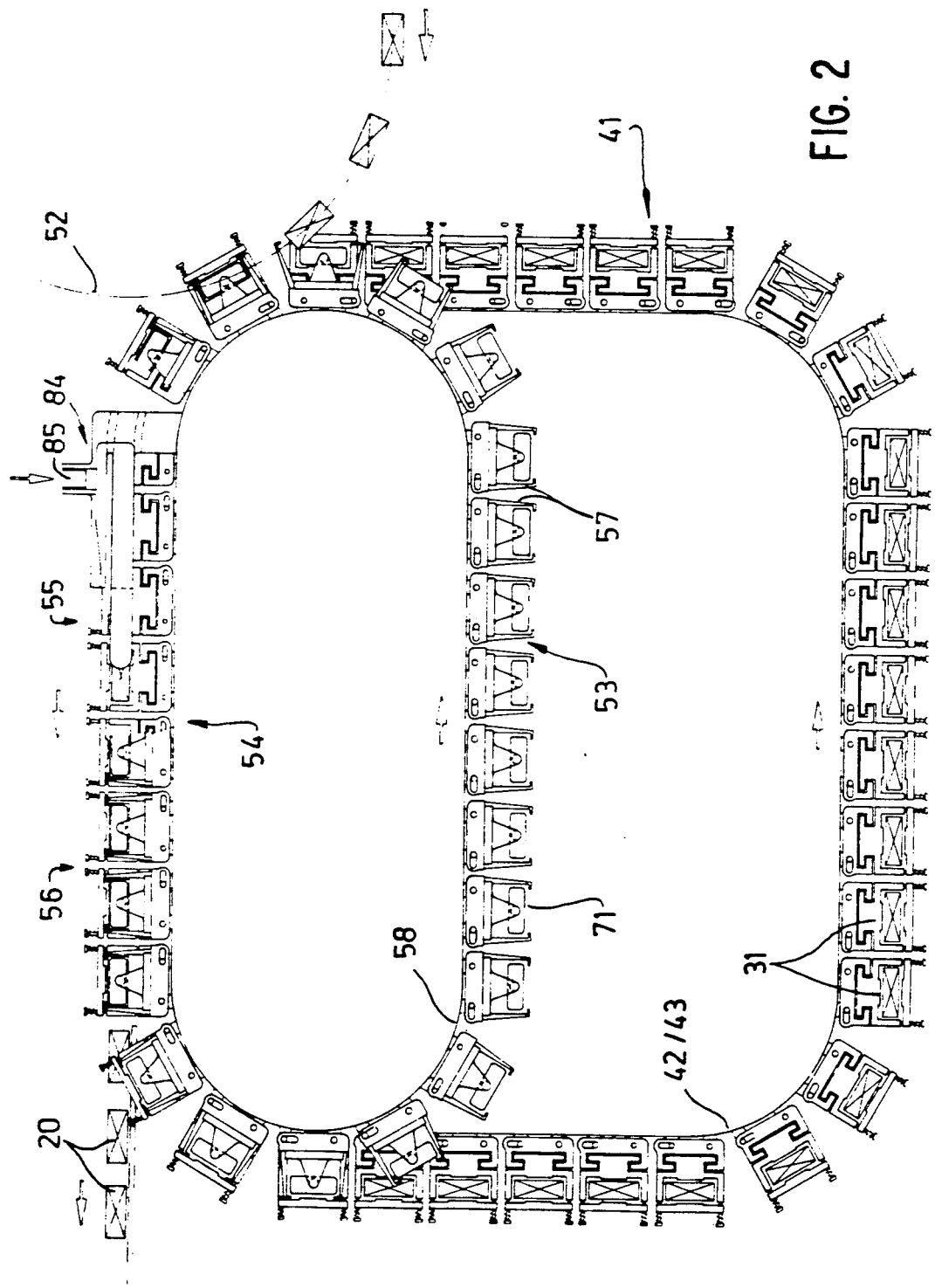
FIG. 2 shows a general side view of the apparatus for treating packs.

A plurality of such pack channels 31 is arranged on an endless conveyor side-by-side in parallel alignment and slightly spaced apart. In the present embodiment, the endless conveyor runs over several, namely four deflecting rollers (not shown). The contour of a channel conveyor 41 with pack channels 31 oriented transverse to the moving direction is shown in FIG. 2.

To form the endless conveyor with the pack channels 31, the latter are mounted on two band or belt conveyors spaced apart from one another, in the present case on toothed belts 42, 43.

The pack channels 31 are indirectly connected to the toothed belts 42, 43 via supporting rails 44 (FIGS. 4, 7, 8 and 11). These are designed with a C-shaped profile, which a dovetailed guide rail 45 on the underside or bottom side 36 of the pack channel 31 engages in the longitudinal direction in a form-fitting positive manner.

For being affixed to the toothed belts 42, 43, the supporting rail 44 is provided on its bottom side with connecting walls 46. The latter have a bore 47 and, located at a distance therefrom, a long hole 48. Ends of bearing bolts 49, 50, which are firmly connected with the toothed belts 42, 43, enter the long hole 48 and the bore 47 of the connecting straps 46. The bearing bolts 49, 50 are anchored in bead-like projections 51 disposed on the upper side of the toothed belts 42, 43 facing towards the pack channels 31 by being embedded therein.

Figure 3:
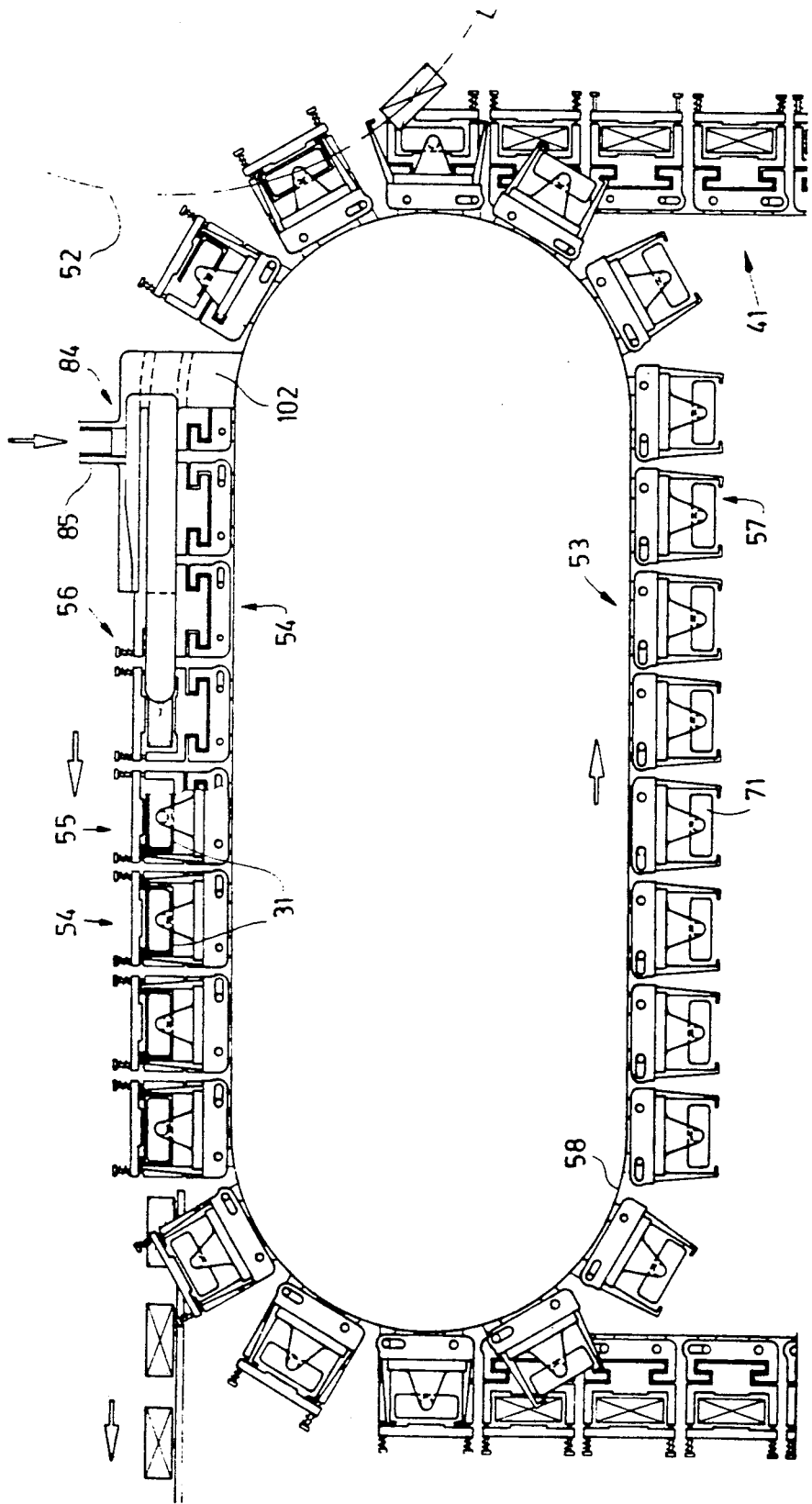
FIG. 3 shows a detail of the apparatus according to FIG. 2, on an enlarged scale.

The mounting of one of the bearing bolts in a long hole 48 allows for relative movements (see for instance FIG. 3) which result from the deflection of the toothed belts 42, 43 in the region of the deflecting rollers (not shown).

The ready-folded packs 20 are directly supplied from a folding turret 52 (or an accordingly designed intermediate conveyor). The packs 20 are then taken over by a pack conveyor 53, which in this case is also designed as an endless conveyor. The pack conveyor 53 extends in an (upright) plane offset relative to the channel conveyor 41. An upper conveying strand 54 of the pack conveyor 53 and a receiving strand 55 being in this embodiment of the same length run in synchronism with one another along a sufficiently long conveying track. This track is a transfer track 56 in which the packs 20 are transferred from the pack conveyor 53 to the channel conveyor 41. This transfer of packs from one conveyor to another is conducted while both conveyors 41 and 53 are continuously moving without any interruptions.

The pack conveyor 53 is provided with pockets 57 arranged closely side-by-side for holding one pack each. The pockets are disposed on an endless conveyor, namely a toothed belt 58. The latter is provided, in analogy to the embodiment shown in FIG. 11, with two projections 59 being spaced apart and affixed on the top side. Bearing bolts 60, 61 penetrate these projections 59. Webs 62 bear against the ends of these bolts, specifically against the bearing bolt 61 with a long hole 63. These webs 62 form part of a pocket bottom 64, on which the pack 20 rests. The pack 20 is laterally limited, namely in the region of the narrow side faces 30, by movable pocket walls 65. These walls 65 are designed with appropriate extensions as two-armed pivotable levers and are each pivotable about a pivot bearing 66. The free upper edges of the pocket walls 65 are formed with transverse holding legs 67, so that the packs 20 are embraced in a hook-like manner at their upper or outer side.

In order to receive a pack 20 from the folding turret 52, the pockets 57 are opened at the radially outer side by moving the pocket walls 65 apart. For this purpose, actuating means 68 in the region of the opening of the pockets 57, are appropriately actuated. Supporting rollers 69 are disposed at the ends of the actuating arms 68. These rollers 69 run up on appropriately designed curved paths (not shown), so that the pocket walls 65 are moved into the open position via the curved actuating arms 68. The pocket walls 65 are constantly loaded in direction of the closed position by a tension spring 70 connecting the oppositely situated pocket walls 65.

Figure 9:
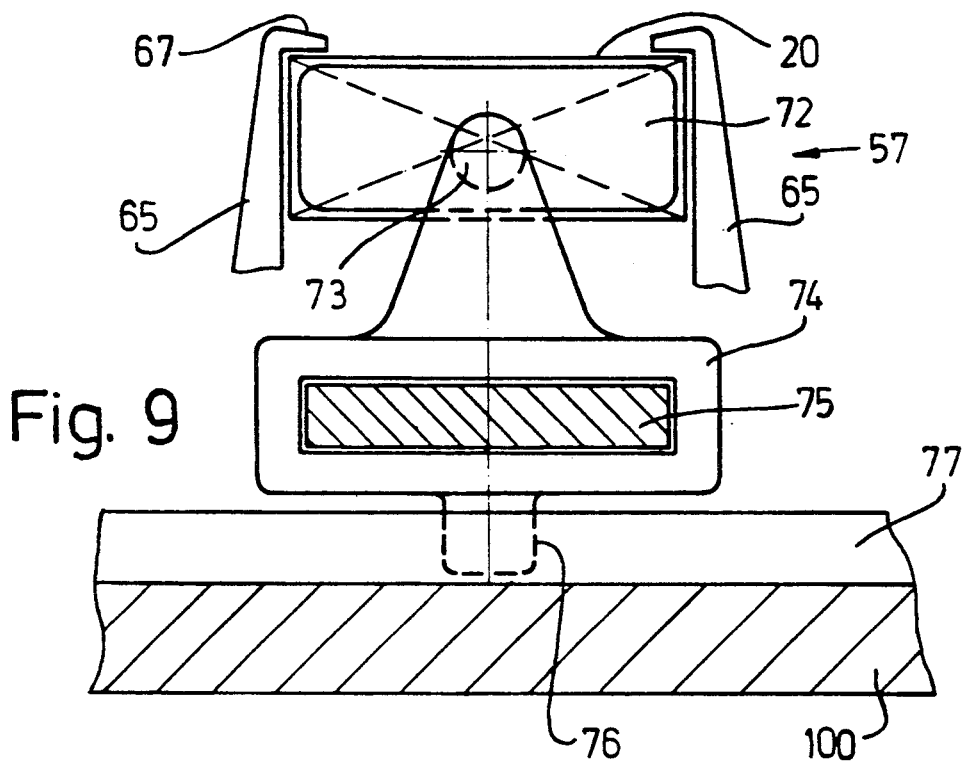
FIG. 9 shows a cross-section taken along the line IX—IX of FIG. 7.
Figure 10:
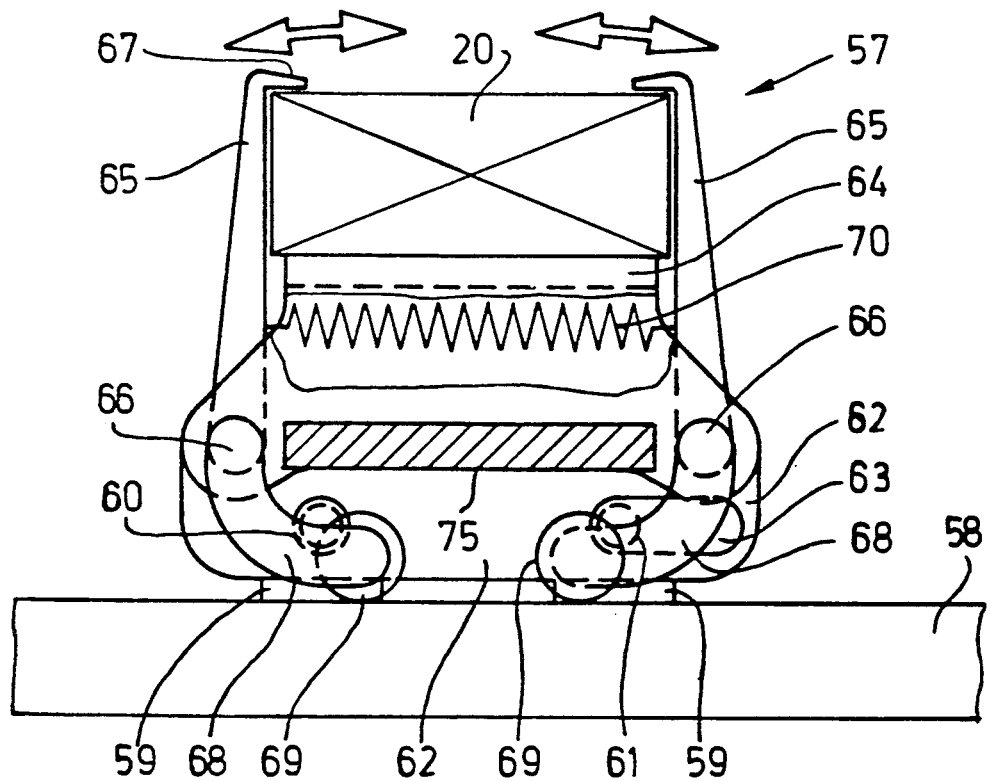
FIG. 10 shows a cross-section taken along the line X—X of FIG. 7.

In closed position of the pockets 67 (FIGS. 9 and 10), the pocket walls 65 are arranged such that the packs 20 can be pushed out of the pockets 57 being open at both ends in the longitudinal direction. For this purpose, each pocket 57 is associated with a slide 71, which continuously circulates with the associated pocket 57. The slide 71 consists of a slide plate 72, which engages the bottom face 35 of the pack 20. An elongated slide rod 73 is connected to a sliding member 74 which is shiftably mounted on a traverse 75. The latter extends parallel to the path of movement of the slide 71, i.e. horizontally.

The slide 71 is automatically controlled, specifically in accordance with the conveying movement of the pocket 57 in the region of the transfer track 56. For this purpose, a guide pin 76 is arranged on the sliding member 74, said pin 76 engaging a stationary cam groove 77. This cam groove 77 is designed such that, with a continuous conveying movement of the pocket 57 with the slide 71, the slide 71 conducts the pushing-out movement, such that the pack 20 is moved from the pocket 57 into a directly opposite pack channel 31 of the channel conveyor 41. Thereafter, the slide 71 returns to the starting position.

The pack conveyor 53 is connected with a separate slide conveyor 78 to form a conveying unit. A further endless conveyor, namely a toothed belt 79, extends at a distance from the pack conveyor 53, that is to say the toothed belt 58 thereof. This toothed belt 79 is designed similarly to the already described exemplary toothed belt embodiments.

At the top side of said toothed belt 79 there are projections in which bearing bolts 80 are held. Webs 81 connected to the traverse 75 bear against and are attached to the ends of said bolts. Thus, the free end of the traverses 75 facing away from the pack conveyor 53 is connected to the toothed belt 79. The other end is connected to the pocket 57 and therewith to the toothed belt 58 of the pack conveyor 53. The unit formed herewith, with two toothed belts 58, 79, is moved continuously, in synchronism with the channel conveyor 41.

The pack channels 31 are designed such that a shaping or shape-stabilizing pressure is applied to the packs 20 having a rectangular cross-section. Several packs 20, in the present case three packs 20, can be held in the longitudinal direction in a pack channel 31. These packs abut one another with their end faces 23 and bottom faces 35. The arrangement has been chosen such that by pushing a pack 20 with the slide 71 into the pack channel 31, a pack 20 is simultaneously pushed out the pack channel 31 via the discharge opening 33. This pushed-out pack 20 has by then circulated several times with the channel conveyor 41 and has spent a respective amount of time inside the pack channel 31, while being pushed forward in steps towards the discharge opening 33. The ready-set packs 20 are moved onto discharge conveyor 82 extending immediately adjacent to the discharge opening 33.

The packs 20 are provided with labels 26 in the region of the end face 23. The label 26 is pushed through a mouthpiece opening which is dimensioned such that the label 26 held ready in front of the mouthpiece opening in a plane transverse to the pushing direction of the packs is folded in a U-shaped manner around the end face 23 and adjoining pack faces. During this inserting or push-through movement, the end face 23 of a pack abuts the bottom face 35 of a pack 20 lying in front. The label 26 is fixed in position between these abutting pack faces during take-over by the end face 23 of a pack 20 and thereafter. This reduces the danger of undesirable displacements of labels 26 until the glue areas for bonding the label 26 have set.

In the present embodiment, the inserting opening 32 of the pack channel 31 is at the same time the mouthpiece opening, in front of which the label 26 is held ready for transfer to a pack 20. The pack channels 31 are provided with bevels 83 (FIG. 7) in the region of the inserting opening 32 at bottom wall and top wall 27.

Figure 5:
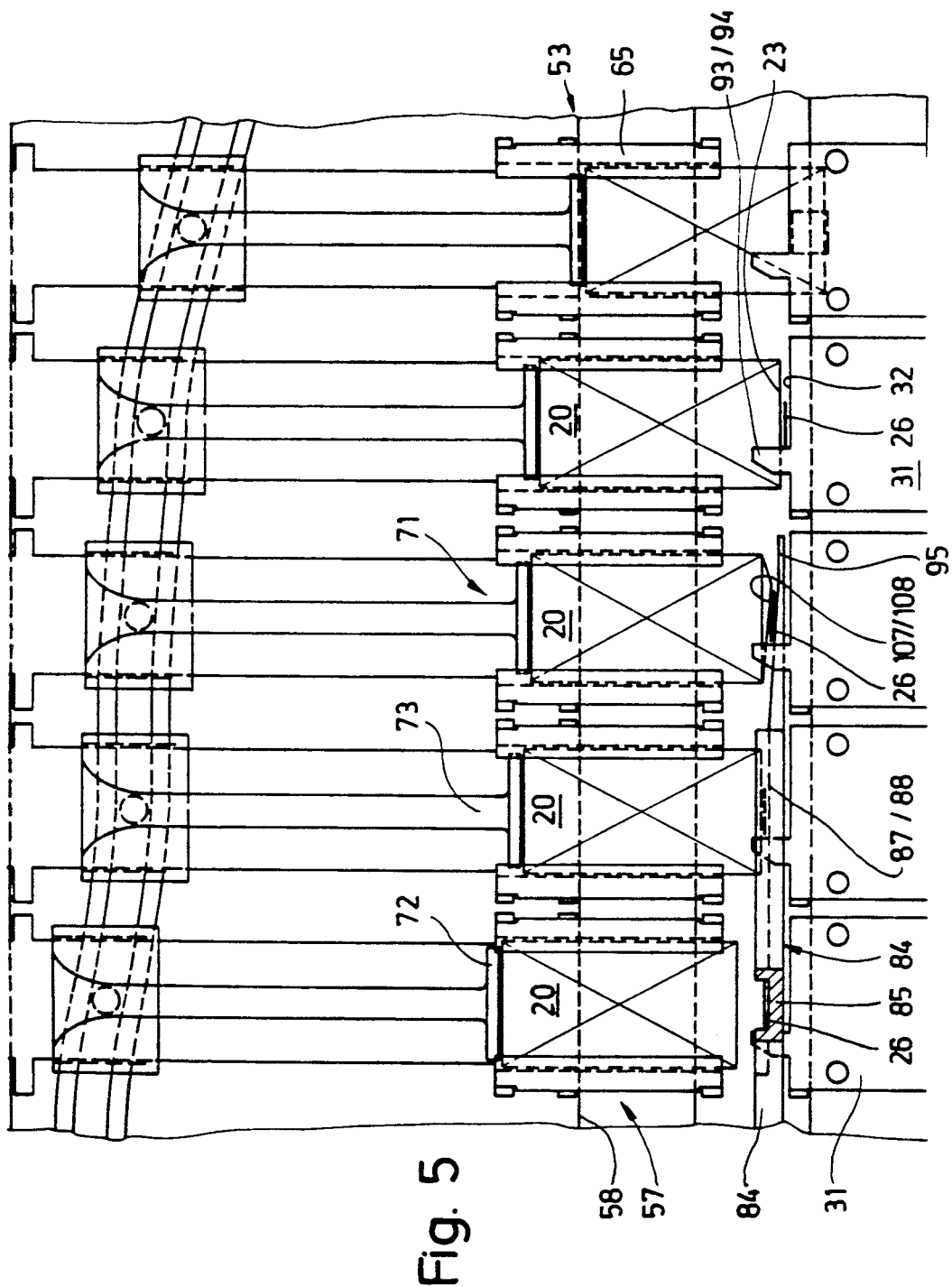
FIG. 5 is a representation in analogy to FIG. 4, with a smaller fraction on an even further enlarged scale, showing an alternative embodiment of a detail.
Figure 6:
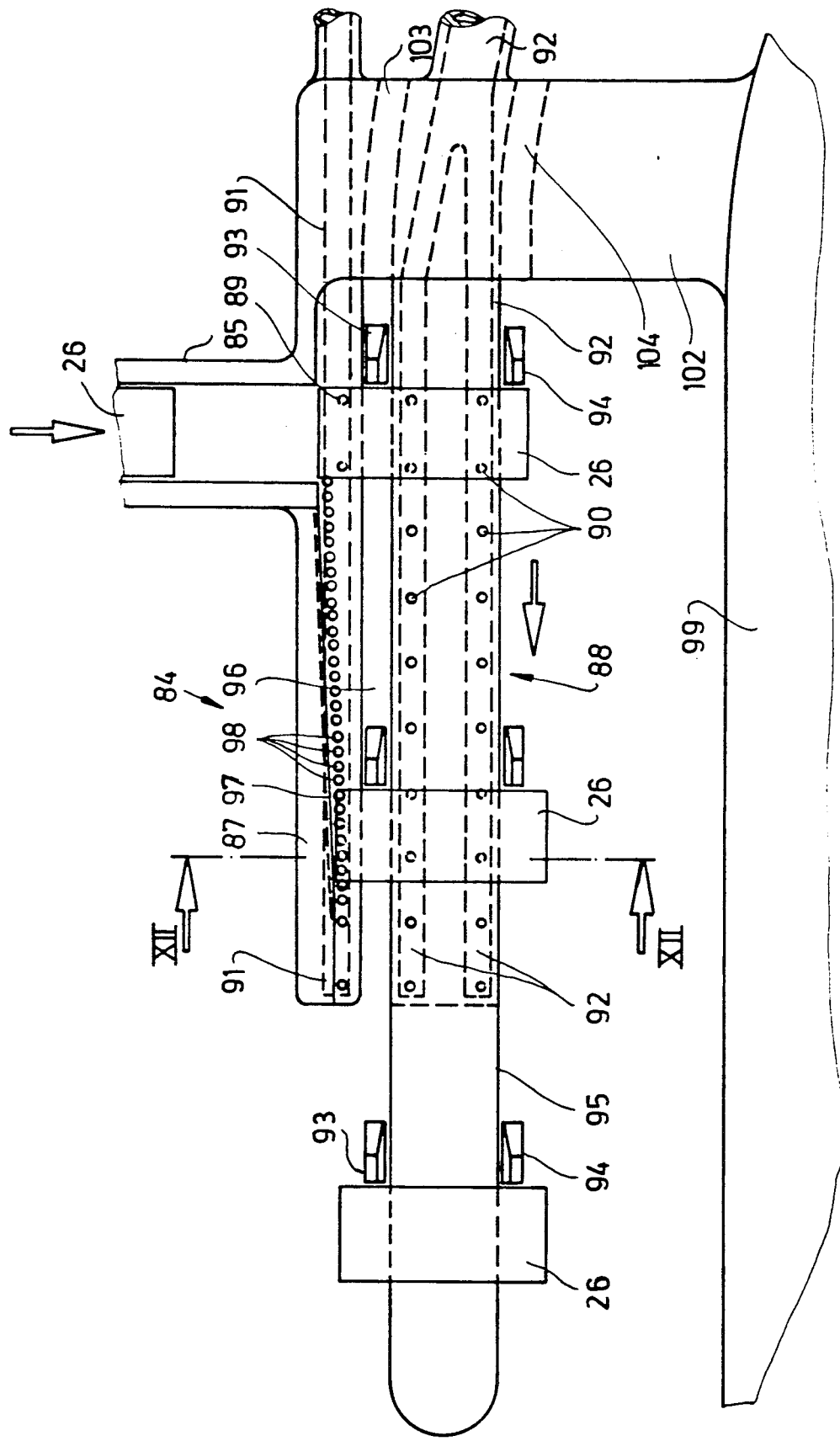
FIG. 6 is a front view of a detail of the apparatus according to FIG. 4 for feeding blanks (labels) to the packs.
Figure 7:
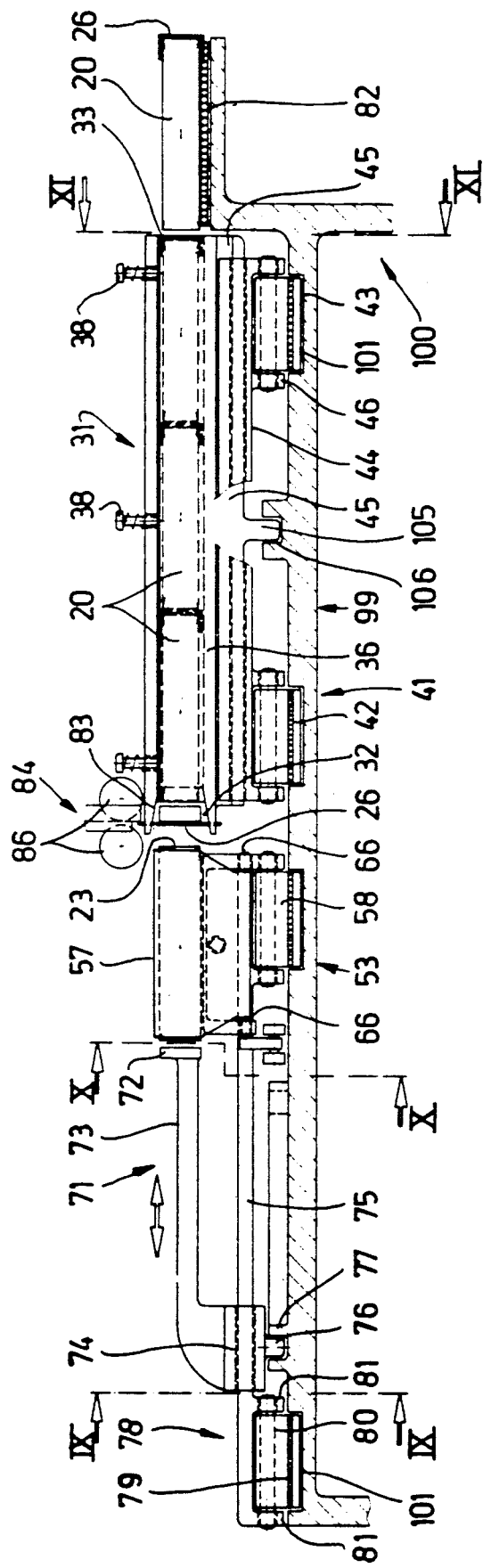
FIG. 7 shows a cross-section of the apparatus (upper region of conveyors) embodiment according to FIG. 4.
Figure 8:
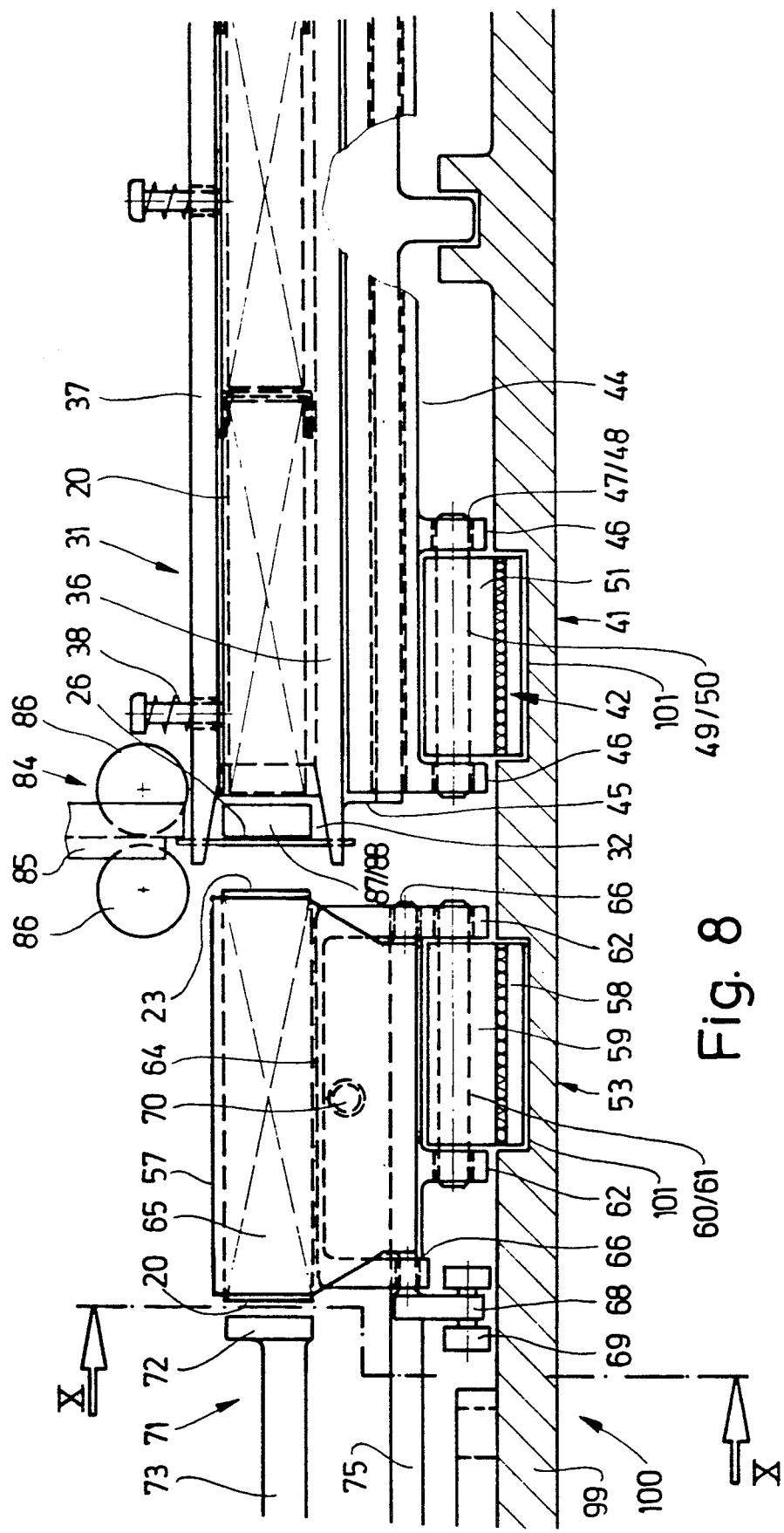
FIG. 8 shows a (central) section of the representation according to FIG. 7, on an enlarged scale—embodiment according to FIG. 4.
Figure 12:
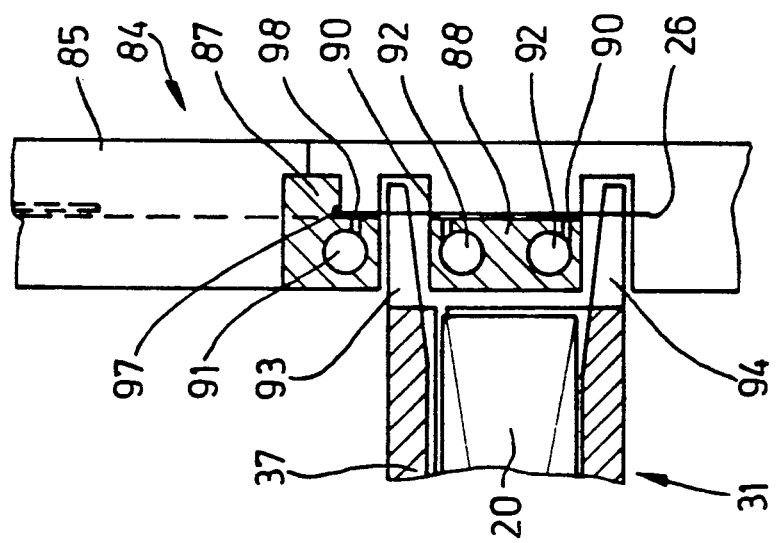
FIG. 12 shows a vertical section taken along the line XII—XII of FIG. 6, on an enlarged scale.

The label is held ready in upright position in the region of the transfer track 56 in front of the inserting opening 32. For this purpose, a stationary label dispenser 84 (FIGS. 5, 6, 7 and 8) is arranged between the pack conveyor 53 and the pack channels 31. The labels 26 are taken from this label dispenser 84 in upright relative position corresponding to the position which they are to have on the pack 20, specifically via an hollow introduction shaft 85 (FIG. 6). The labels 26 are successively transported in downward direction in this introducing shaft 85 by means of conveying rollers 86 until they come to abut a holding means with suction bores. In the present case, this holding means consists of two elongated guide webs 87 and 88 (FIGS. 6, 8 and 12). The labels 26 rest on these webs 87, 88 with their outer side, i.e. with the (adhesive-free) side facing away from the pack 20. Suction bores 89 in the region of the upper guide web 87 and two rows of suction bores 90 in the region of the guide web 88 located thereunder holds the labels 26 in the upright position. The suction bores 89 and 90 are connected to a vacuum source via suction conduits 91, 92.

Figure 4:
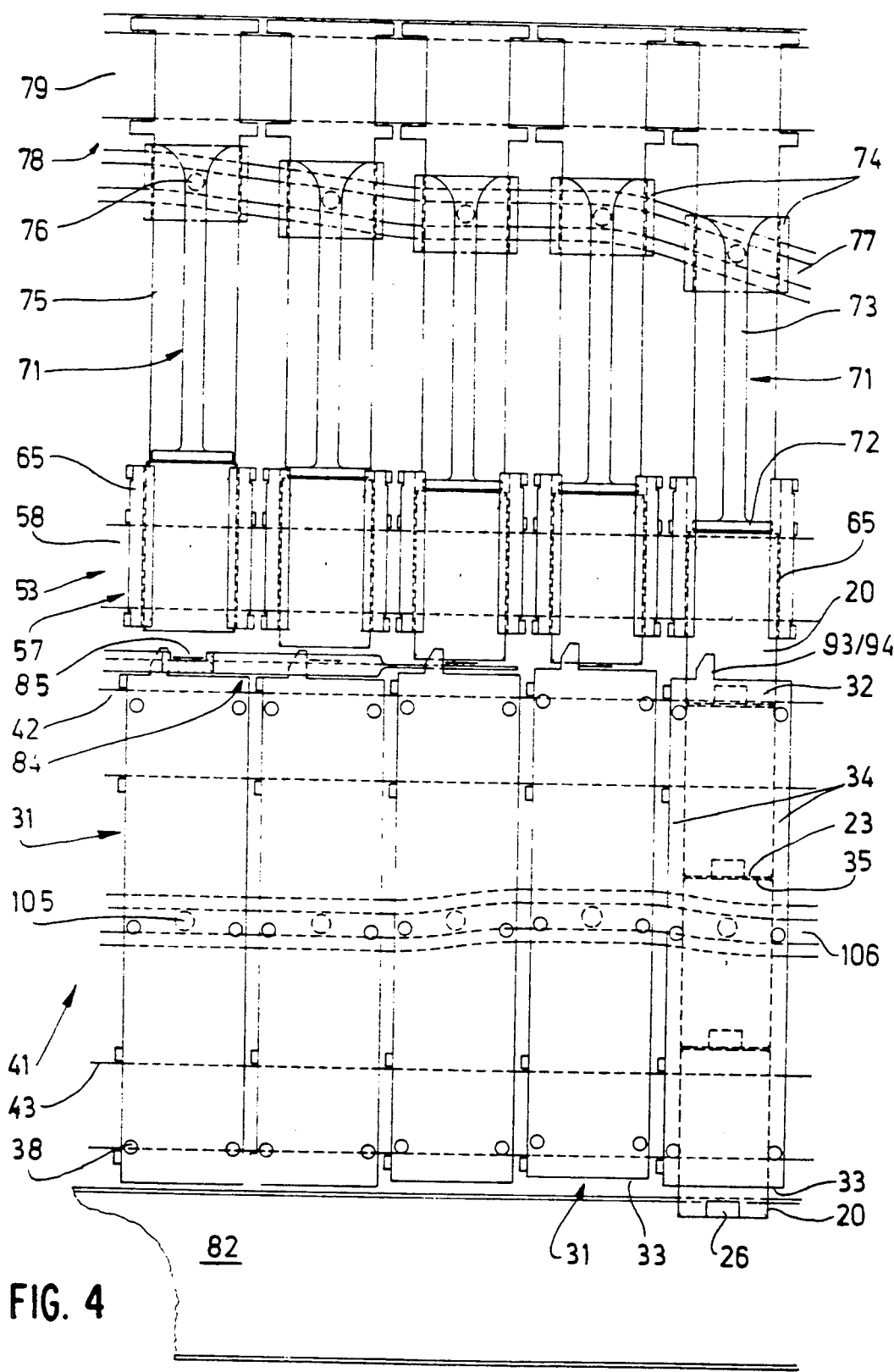
FIG. 4 shows a detail of the apparatus in a (top) plan view.

The labels 26 are transferred to the packs 20 while the latter are continuously transported. Immediately after a label 26 has been conveyed into the region of the guide webs 87, 88 underneath the introduction shaft 85, the label 26 is engaged by carriers 93, 94 which are arranged at a distance above one another and transport the label in the horizontal direction, namely in front of the end faces 23 of associated packs 20. The carriers 93, 94 are arranged such, that the labels are centrally aligned relative to the end faces 23. For this purpose, the carriers 93, 94 are arranged offset relative to the longitudinal mid-plane of the pack channel 31 (FIGS. 4 and 5).

In the present embodiment, the carriers 93, 94 are disposed at the pack channels 31, specifically on bottom wall 36 and top wall 37 thereof, respectively. Since the pack channels 31 are conveyed in synchronism and in alignment with the packs 20, the exact relative position of the labels 26 relative to the packs 20 is herewith ensured.

During transport, the suction bores 89, 90 apply a slipping holding force to the labels 26 by means of the vacuum which is generated. Because of the limited number of side-by-side suction bores 89, 90 on a predetermined conveying track of the labels 26 (FIG. 6), this holding force is limited and only effective until the label 26 is transferred to the pack 20, that is to say to the end face 23 thereof. The label 26 is held on this end face 23 beyond the region of the suction bores 89, 90. The (lower) guide web 88 which is holding and guiding the central portion of the label 26 is, apart from the suction bores 90, also provided with a tongue 95 (FIGS. 5, 6, 14 and 15), which does not have suction bores and which serves for securing the label 26 in the position of abutment with the end face 23.

A slot 96 is formed between the guide webs 87, 88 into which the upper carrier 93 of the pack channel 31 enters in the course of the conveying movement. The lower carrier 94 is located below the guide web 88.

In the present embodiment, the arrangement has been chosen such that the label, after being supplied via the introduction shaft 85, has to be lowered to be exactly positioned. For this purpose, a guide edge 97 is formed on the upper guide web 87 which follows the introduction shaft 80 in the conveying direction. This guide edge 97 is downwardly inclined at an acute angle in the conveying direction, so that the label 26 can be downwardly shifted during the transport movement. In order to secure this movement and to avoid undesirable displacements of the label 26, a continuous row of bores 98 closely located side-by-side is provided underneath the guide edge 97 in the guide web 87. The row of these suction bores 98 follows the contour of the guide edge 97.

Two different exemplary embodiments concerning the transfer of the labels 26 to the packs 20 are shown. According to FIG. 4, the tongue 95 extends as an extension of the contact surface for the label 26 formed by the guide webs 87 and 88, approximately in a mid-plane of the label dispenser 84 (FIG. 4). As a result, the label still has a certain distance to the inserting opening 32 of the pack channels 31 in the region of the thin sheet-like tongue 95. For taking over the label 26, the pack channels are thus shifted in the longitudinal direction, namely towards the pack which is to be received, first up to the tongue 95 and then further, as shown in FIG. 4. After the region of the tongue 95 is left, the inserting opening 32 is approximately located in the plane of the tongue, so that with a continued movement, the label 26 is transferred from the tongue 95 to the mouthpiece-like inserting opening 32. During this stage of movement, the pack 20 which is to be received has been moved to the mouthpiece or inserting opening 32 thus far, that the label 26 located in front of this inserting opening 32 is engaged by the end face 23 of the pack 20 and is fixed in position between said end face and the bottom face 35 of the pack 20 in front. In the further course, the pack channel 31 is moved back into the starting position.

For shifting the pack channels 31, the guide rail 45 arranged on the bottom side thereof is movably mounted in the supporting rail 44 connected with the toothed belts 42, 43. The guide rail 45 is provided with a tappet 105 at its bottom side which enters a stationary cam groove 106 of the machine plate 99. The shape of the cam groove 106 is chosen such that the pack channels move towards the approaching pack 20 during the conveying movement and thereafter return to the starting position (FIG. 4).

In the alternative embodiment which is particularly shown in FIG. 5, there is no need for a longitudinal displacement of the pack channels 31 for taking over the label 26. Instead, the tongue 95 of the label dispenser 84 is designed such that the label 26 is moved towards the associated pack channel 31 during transport while it is contacting the tongue 95 because the tongue has a displaced design or arrangement in the direction of the associated pack channels 31. For this purpose, the tongue 95 is designed with an inclined sliding surface 109 for contacting the label 26.

Figure 15:
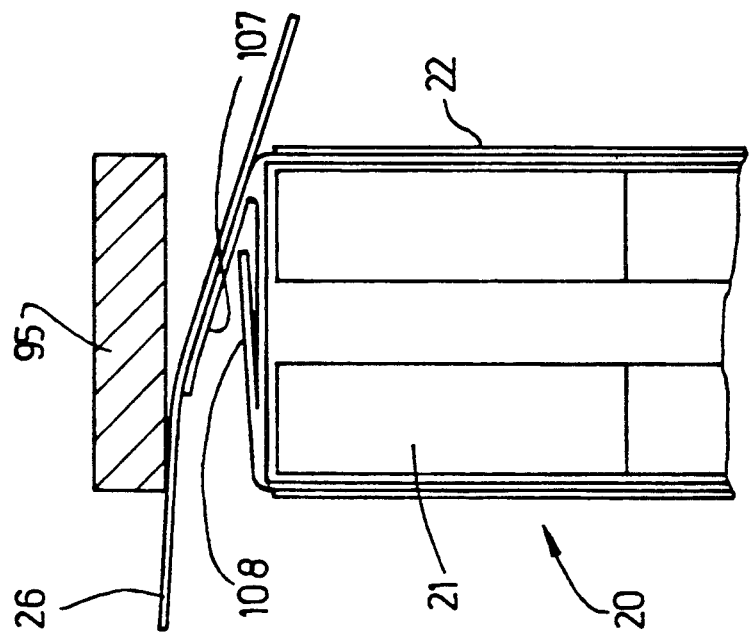
FIG. 15 shows a cross-section taken along the line XV—XV of FIG. 14.
Figure 14:
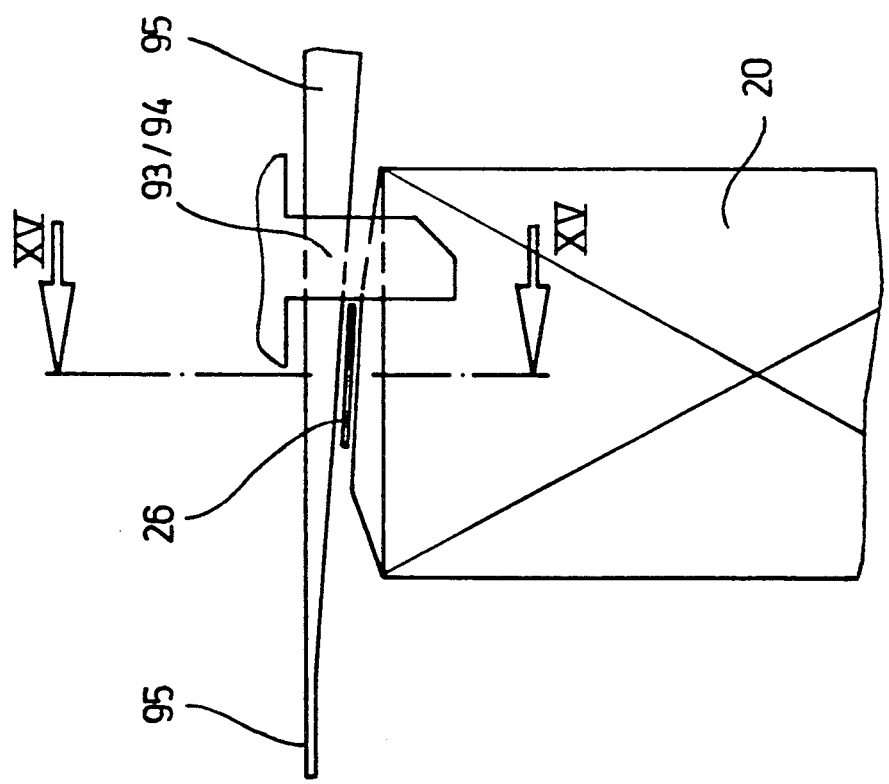
FIG. 14 shows a pack in the region of its top end face with details of the embodiment according to FIG. 5, on an enlarged scale.

During this stage of movement, the packs 20 have been moved towards the tongue 95 far enough for the end face 23 being formed of non-bonded folding tabs to receive the label 26 on the free (adhesive) side and to fix the same in position while the label still abuts the tongue 95 (FIGS. 14 and 15). This embodiment makes use of the behaviour of folding tabs 107, 108 in the region of the end face 23 of the pack 20. The folding tabs 107, 108 partially covering one another have, as a result of the properties of their material, restoring forces which hold the folding tabs 107, 108 in an inclined position (FIG. 15). The folding tabs 107, 108, which are projecting from the end face 23 in this way, engage the label 26, particularly the outer folding tab 107. At the same time, the adhesive bond of the label 26 takes effect by adhering to the folding tab 107. The continuing conveying movement pushes the pack 20 closer to the tongue 95, in which process the folding tabs 107, 108 are pushed into their proper folding position. Simultaneously, the label is pressed against the end face 23. After the label 26 has left the region of the tongue 95 it directly comes to abut the inserting opening 23 of the pack channel 31 with its side facing away from the end face 23, as a result of the tongue 95, due to its design, being offset in the direction of this inserting opening 32.

In the further course of movements, the label 26 is folded in the described way, the bottom face 35 of the pack 20 located in front acting as an additional holding means for the label 26.

The described parallel-extending conveyors, which convey the means associated therewith, i.e. toothed belts 42, 43 and 58, 79, are mounted on a common supporting means, namely a continuous machine plate 99 which is part of a machine frame 100. In the region of the toothed belts, indentations 101 are formed in the machine plate 99 so that the toothed belts can run therein. The label dispenser 84 is also connected to the machine frame 100 or machine plate 99 via a supporting arm 102. For the carriers 93, 94, grooves 103, 104 are embedded in the region of the supporting arm 102.

The apparatus is also suitable for the processing of such packs which are not to be provided with a label 26. In this case, the means necessary for the supply and transfer of the label are missing.

What is claimed is:

1. In an apparatus for attaching a strip-like label (26) to a top end face (23) of each one of a plurality of cuboidal packs being conveyed in a longitudinal forward conveying direction, wherein each label (26) is held in front of a corresponding mouthpiece (32) in conveying direction and in a plane transverse to the conveying direction of each pack (20) whose top end face (23) is pointing in the conveying direction, and wherein said label is folded around said top end face (23) and adjoining pack faces (24, 25) in a U-shaped manner when the pack (20) is pushed through the mouthpiece (32), the improvement comprising:

transporting means for continuously moving mouthpieces (32) and packs (20) transversely to said longitudinal conveying direction in a position of relative alignment; and means for transporting labels (26), prior to the U-shaped folding thereof, to a position in front of and at a distance from a mouthpiece (32) and transversely to said longitudinal conveying direction in synchronism with the movement of said mouthpiece, so that the labels (26) are moved by corresponding longitudinally moving packs (20), as a result of the forward conveying of the packs (20), until the labels abut the mouthpiece (32).

2. The apparatus as claimed in claim 1, wherein:

said transporting means comprises a pack conveyor (53) and a channel conveyor (41) which run in parallel with each other and which continuously move the packs (20) and said mouthpieces (32), respectively, in synchronism with each other; and said means for transporting labels comprises a label dispenser (84), located between said pack conveyor (53) and said channel conveyor (41), for positioning the labels (26) at said position in front of a mouthpiece.

3. The apparatus as claimed in claim 2, wherein said label dispenser (84) is fixed in location between said pack conveyor (53) and said channel conveyor (41), and wherein the labels (26) are conveyed along said label dispenser (84) as a result of being taken along by an associated mouthpiece (32).

4. The apparatus as claimed in claim 3, further comprising carriers (93, 94), disposed on each mouthpiece (32), for transporting the labels (26) in a proper orientation in a region of said label dispenser (84).

5. The apparatus as claimed in claim 2, further comprising means for supplying suction air to said label dispenser (84) for holding the labels (26) thereon while permitting the labels to be pulled off in a slipping manner by being taken along by a moving pack (20).

6. The apparatus as claimed in claim 3, further comprising means for feeding the labels (26) transverse to the longitudinal conveying direction of the packs (20) via a hollow introduction shaft (85) of said label dispenser (84), and for transporting the labels (26) to a position, approximately centrally in front of said mouthpieces (32), in synchronism with the packs (20).

7. The apparatus as claimed in claim 3, wherein said label dispenser (84) comprises guide webs (87, 88) for holding the labels (26), said guide webs (87, 88) being provided with rows of suction bores (89, 90) for fixing the labels (26) in place on said guide webs.

8. The apparatus as claimed in claim 7, wherein said label dispenser (84) comprises a tongue (95) on which, after leaving said guide webs (87, 88) provided with said suction bores (89, 90), the labels (26) come to rest, and from which a label is transferable to the top end face (23) of a pack (20).

9. The apparatus as claimed in claim 2 or 3, wherein said transporting means transports the labels (26) to a position at a distance from said mouthpieces (32) in a region of said label dispenser (84), and further comprising, for reception of the labels (26) by said mouthpiece, means for displacing said mouthpieces (32) from a starting position in a longitudinal direction relative to the labels (26) and for moving said mouthpieces back to the starting position after a label has been received.

10. The apparatus as claimed in claim 8, wherein, during transport of the label, the label is shifted in the region of said label dispenser (84) in a direction towards the mouthpiece (32), and wherein said tongue (95) has a contact surface downwardly inclined in the direction of a mouthpiece (32) such that the labels (26) are located directly in front of the mouthpiece (32) when they leave the tongue (95) and are engageable by the top end face (23) of the pack (20).

11. The apparatus as claimed in claim 4, wherein said carriers (93, 94) extend above and below a guide web (88) engaging a central portion of the label (26) via two rows of suction bores (90) to which suction air is applied.

12. The apparatus as claimed in claim 9, wherein each said mouthpiece is an inserting opening (32) of an elongated hollow pack channel (31) in which several packs (20) are received successively in the longitudinal direction, and wherein the top end face (23) of each pack (20) bears against an opposite bottom face (35) of an adjacent downstream pack (20).

13. The apparatus as claimed in claim 12, wherein each pack channel (31) has a cross-section corresponding to the outer contours of a pack (20) so that each pack is surrounded by said pack channel (31) in a shaping manner.

14. The apparatus as claimed in claim 12, wherein there are a plurality of pack channels (31) which are shiftably mounted on supporting rails (44), and further comprising guide rails (45) which are disposed on a bottom side (36) of said pack channels (31) and which are connected to said supporting rails (44) in a form-fitting positive manner.

* * * * *